Dec. 12, 1961  W. H. McLELLAN  3,013,158
LINEARIZATION OF LATERAL PHOTOCELLS
Filed Jan. 11, 1960  3 Sheets-Sheet 1

INVENTOR.
WILLIAM HOWARD McLELLAN
HERZIG & JESSUP
ATTORNEYS
By Warren T. Jessup

Dec. 12, 1961 W. H. McLELLAN 3,013,158
LINEARIZATION OF LATERAL PHOTOCELLS
Filed Jan. 11, 1960 3 Sheets-Sheet 2
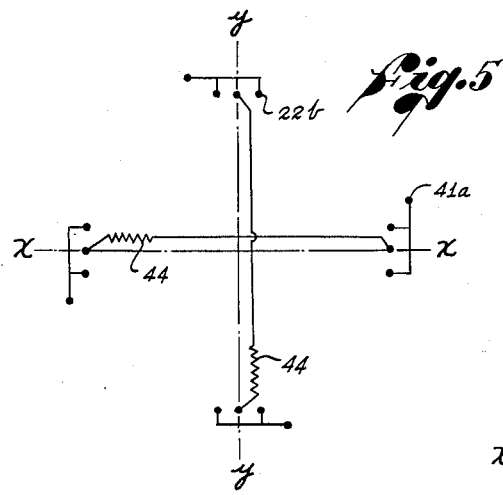
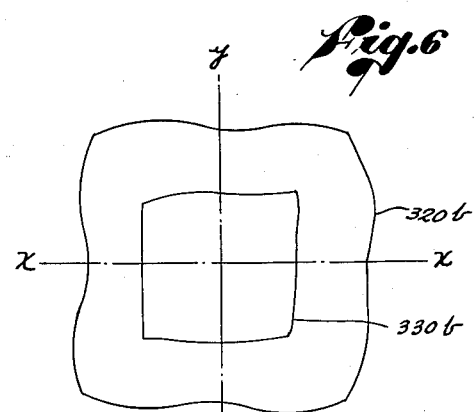
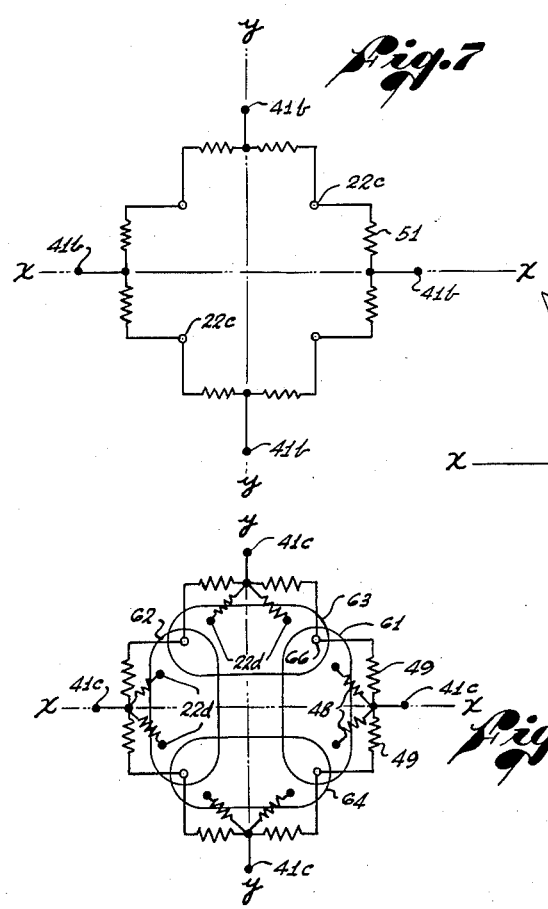
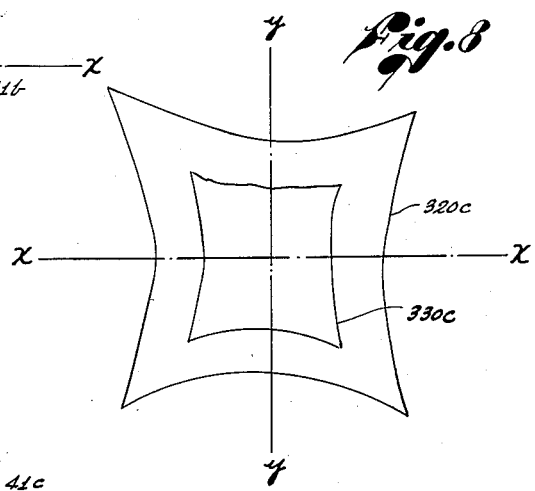
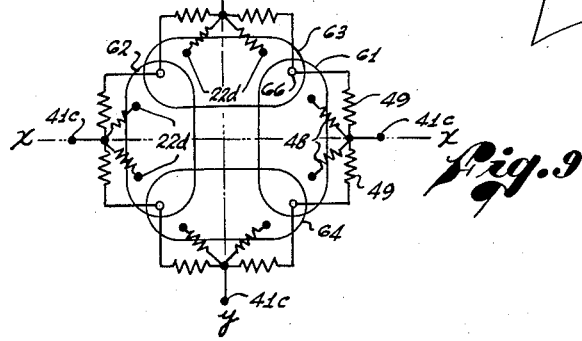
INVENTOR.
WILLIAM HOWARD McLELLAN
HERZIG & JESSUP
ATTORNEYS
By Warren T. Jessup Dec. 12, 1961 W. H. McLELLAN 3,013,158
LINEARIZATION OF LATERAL PHOTOCELLS
Filed Jan. 11, 1960 3 Sheets-Sheet 3
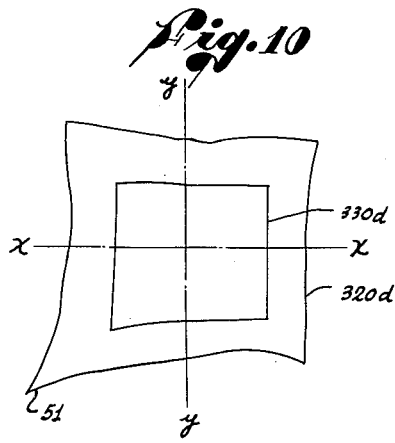
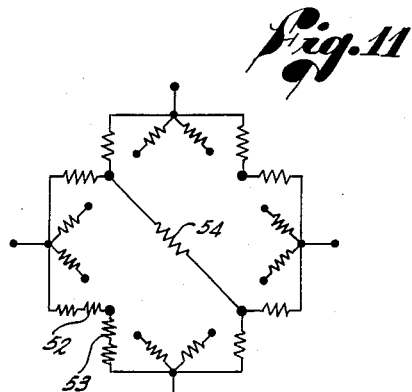
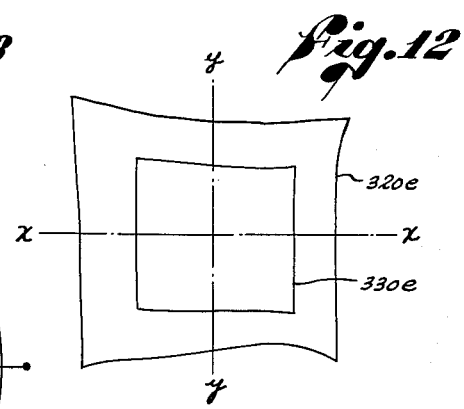
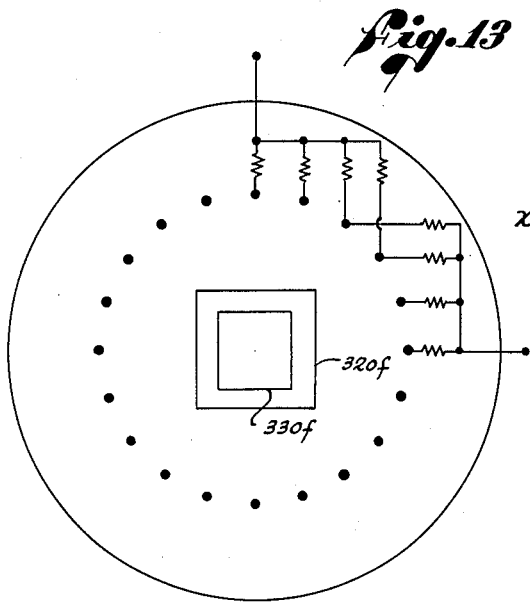
INVENTOR.
WILLIAM HOWARD MCLELLAN
HERZIG & JESSUP
ATTORNEYS
By Warren T. Jessup United States Patent Office 3,013,158
Patented Dec. 12, 1961

3,013,158
LINEARIZATION OF LATERAL PHOTOCELLS
William Howard McLellan, 170 N. Daisy Ave.,
Pasadena, Calif.
Filed Jan. 11, 1960, Ser. No. 1,538
5 Claims. (Cl. 250—211)

This invention relates to the linearization of lateral photocells.

It is an object of this invention to provide means for making the output of a lateral photocell linear or substantially so.

It is another object of this invention to provide means for linearizing a lateral photocell in a simple and economical manner which does not involve expensive reworking of the cell itself.

In accordance with these and other objects which will become apparent hereinafter, preferred forms of the present invention will now be described with reference to the following drawings wherein:

FIG. 5 is another form of the present invention somewhat more refined than that of FIG. 3.

FIG. 6 is a response curve derived from the arrangement of FIG. 5.

FIG. 7 is a circuit arrangement illustrating the possibilities and ramifications of the concepts of the present invention.

FIG. 8 is a response curve derived from the arrangement of FIG. 7.

FIG. 9 is another more refined arrangement of the present invention.

FIG. 10 is a response curve derived from the arrangement of FIG. 9.

FIG. 11 is still another and more refined arrangement constructed in accordance with the present invention.

FIG. 12 is a response curve derived from the arrangement of FIG. 11; and

FIG. 13 is a still more refined arrangement constructed in accordance with the present invention with the response curve being shown directly on the figure.

The lateral photocell is a relatively new development, being first formally described in detail in the Proceedings of the IRE for April 1957, in an article beginning on page 474 entitled "A New Semi-Conductor Photocell Using Lateral Photo Effect," J. Torkel Wallmark, Member, IRE.

Figure 1:
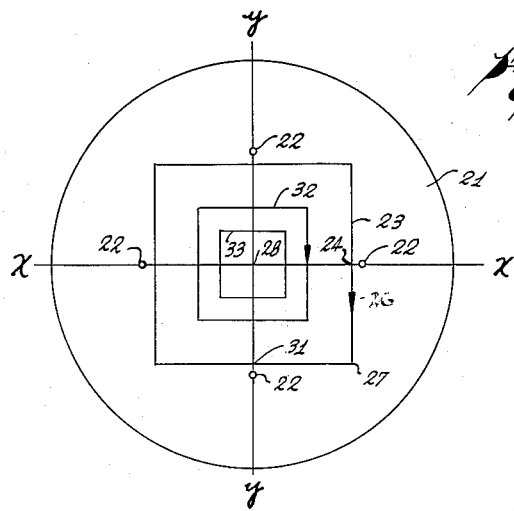
FIG. 1 is a plan view, somewhat schematic, of a lateral photocell arrangement of the prior art.

It was discovered, as a forerunner to the present invention, that when used as a two-axis pickup, a lateral photocell exhibits marked non-linearity, which seriously limits and restricts its use and applicability. For example, FIG. 1 illustrates a junction lateral photocell consisting of a semi-conductor wafer 21, on the surface of which are mounted tiny dot contacts 22. A spot of light may be cast on the wafer 21 and caused to follow a square path 23. The spot of light causes electrical signals to appear at the contacts 22 which are connected to individual terminals from which the output of the cell 21 is read and plotted or otherwise noted and/or recorded. When the contacts 22 are connected to an electroplotter, a device which causes a recording pen to trace the magnitude of the voltage applied thereto, there would be traced an exact square corresponding to the path or trace 23 of the light spot if the cell 21 were perfectly linear.

Figure 2:
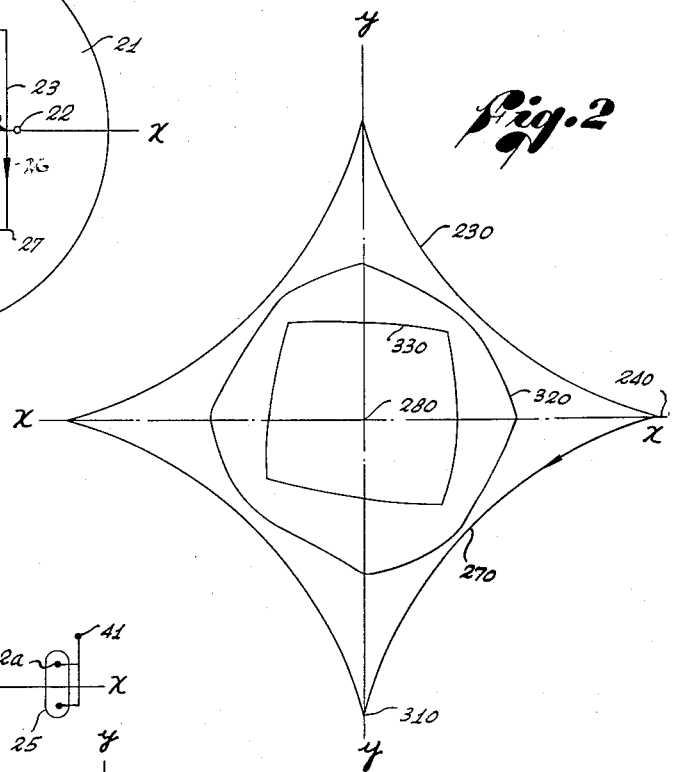
FIG. 2 is a graph illustrating a response curve from the photocell arrangement of FIG. 1.

In fact, however, the actual pattern traced is pointed, or star-shaped, as shown at 230 in FIG. 2, which represents the actual output or graph of the electroplotter. At the point 24, where the light path 23 is closest to the right-hand terminal 22, the signal from that terminal is very strong and causes the trace to pull far to the right, as shown at 240. In going to the next contact, as shown by the arrow 26, the light path 23 traverses the square corner 27. At this point, however, the non-linear sensitivity of the cell is such that the trace is actually pulled in toward the center point 280, as shown at 270 in FIG. 2. As the light trace 23 approaches the bottom contact 22, as shown at the point 31, that contact now picks up a very strong signal and causes the extreme swing of the plotter as shown by the point 310.

A next smaller square, for example, the square light trace 32, exhibits less non-linearity, but it, too, is far from a square pattern, being more nearly circular, as shown by the graph 320 in FIG. 2. The inner square trace 33 is the most linear, as shown by the graph 330, but the useful area covered is such a small percentage of the wafer 21 that the effectiveness of the photocell as a pickup device is seriously restricted.

In accordance with the present invention, the useful area is greatly multiplied by bringing a much greater area of the wafer 21 into a substantially linear region. Basically, this is achieved in accordance with the present invention by providing pairs of contact groups, rather than merely pairs of individual contacts. For example, in FIG. 1, the right and left contacts 22 constitute a pair of individual contacts, which together produce an X output for the electro-plotter. The upper and lower contacts 22 constitute a pair of individual contacts, which together produce a Y output. Combined they produce the output pattern of FIG. 2. In accordance with the present invention, the individual contacts 22 are replaced by contact groups, wherein the individual contacts of each group are disposed symmetrically on each side of the cell axis, for example, the X axis illustrated in FIG. 1.

Figure 3:
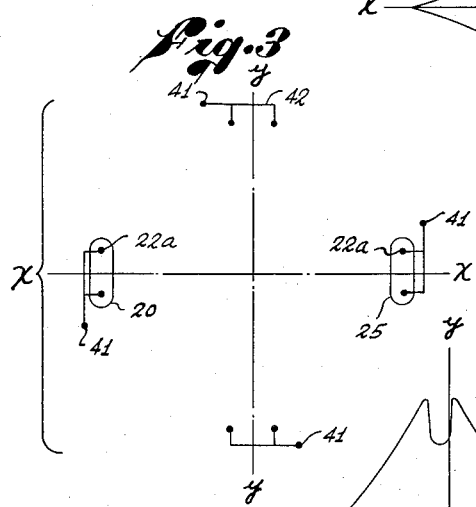
FIG. 3 is a schematic view illustrating a rudimentary form of the present invention.

A rudimentary form of the present invention is shown in FIG. 3, wherein, at opposite ends of an imaginary line constituting the X axis of the cell, there are disposed a pair of 20 and 25 of groups of contacts 22a. In this instance, each group consists of two contacts, and it will be noted that these two contacts are disposed substantially symmetrically, like mirror images, with respect to the X axis 36a. The Y axis is similarly provided with a pair of contact groups as shown. Each group of cells 22a constitutes a pole, 25 for example, from which an output of the cell is taken by means of a terminal 41. Suitable networks interconnect the individual contacts of each group and include terminals 41 forming the four output terminals of the cell. In the embodiment shown in FIG. 3, the networks consist of simple interconnections 42 between the two contacts of each of the four groups.

Figure 4:
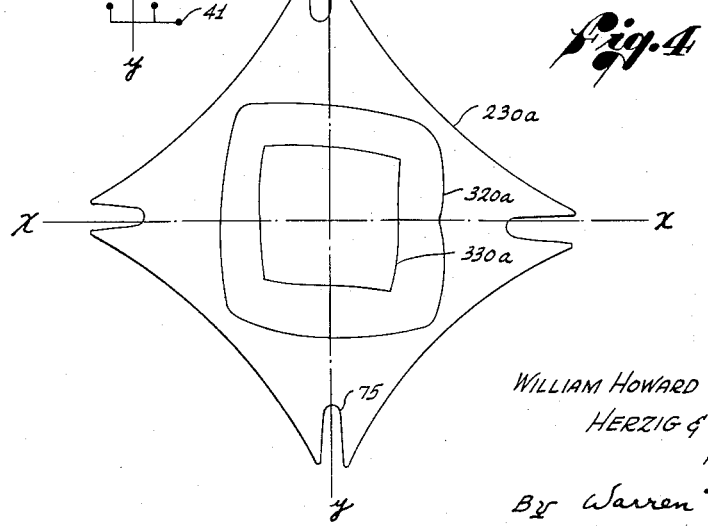
FIG. 4 is a response curve derived from the arrangement of FIG. 3.

The response pattern resulting from the arrangement shown in FIG. 3 is illustrated in FIG. 4. To create this response pattern from the plotter, the light trace was caused to follow the same three squares illustrated in FIG. 1, but with the single contact 22 replaced by the contact groups 22a.

As seen in FIG. 4, while the outer trace 230a is still unusable, the marked effect of the arrangement is shown by the pulling in of the pointed corners at 75. The intermediate trace 320a is much improved, and the inner trace 330a is very good, with only a slight bulge in the sides of the square.

A still more refined arrangement is shown in FIG. 5, wherein each group of the two X axis groups, and each group of the two Y axis groups, consists of three contacts 22b, one of the contacts in each group being directly on the axis and the other two being symmetrically disposed, one at each side of the central contact. As in the embodiment of FIG. 3, the two outer contacts are connected together and to the output terminals 41, while the central contacts are cross-connected within a given pair by a linking impedance in the form of resistance 44.

FIG. 6 shows the resulting plotter output when the light trace input consists of squares 32 and 33, as in FIG. 1. The outermost trace 23 has been omitted because, in any event, it represents such an extreme that any effort to obtain linearity in this fringe area would be uneconomic in view of the complexity of the circuitry required. As noted, the trace 320b is improved in its general linearity over the trace 320a, and the trace 330b is similarly improved over the previous arrangement resulting in the trace 330a.

Reverting to the trace of FIG. 2, it will be noted that the points of the star of the outer trace 230 lie on the X and Y axes. These points may be electrically rotated through 45 degrees by the circuit shown in FIG. 7, wherein only four contacts 22c are employed, but each contact is a member of two groups. For example, the upper right contact 22c is a member of the righthand group of the X axis pair of groups and also a member of the upper group of the Y axis pair of groups. This is effected by interconnecting the contacts by the networks consisting of the resistors 51 which interconnect the contacts to four terminals 41b. As a result, the points of the four-pointed star are pulled around to the 45-degree radii, as shown by the traces 320c and 330c.

A more sophisticated circuit arrangement is shown in FIG. 9, wherein each group 61–64 of contacts contains four individual contacts 22d. The innermost two of the individual contacts of each group, i.e., those closest to their axis, are connected to the output terminals 41 of the group by a respective pair of resistances 48. The outermost two contacts of each group are likewise connected to the terminal 41c as shown. It will thus be seen that the circuit of FIG. 9 is somewhat of a composite of the circuits of FIGS. 3 and 7.

In FIG. 9, the contact group encircled by the line 61 represents the righthand pole of the X axis of the cell, the output of which is taken from the righthand terminal 41c. The group of contacts 22d encircled by the line 62 represents the opposite pole of the pair of contact groups serving the X axis, the output of which is taken from the lefthand terminal 41c. The contact group circled by the line 63 represents the uppermost pole of the Y pair of contact groups, the output of which is taken through the network to the uppermost of the terminals 41c. The group of contacts circled by the line 64 represents the lowermost pole forming the bottom pole for the Y axis. It will be noted that four of the contacts 22d are common to two adjacent poles. For example, the contact 66 is a member of the group constituting the upper pole of the Y axis and also of the group constituting the righthand pole of the X axis.

The resulting trace pattern is shown in FIG. 10 by the graphs 320d and 330d. It will be noted that the innermost trace 330d is quite square although the trace 320d exhibits an asymmetrical point 51 in the lower left corner. This asymmetry is due to the fact that the cell wafer 21 is not completely homogeneous. That is to say, the distributed resistance over the face of the cell is not completely uniform. Any given cell may be selectively corrected in the manner shown in FIG. 11 wherein the cell exhibiting the characteristic of FIG. 10 has been provided with a circuit which is basically similar to that of FIG. 9, but an additional pair of resistances 52 and 53 have been added to the lower left portion of the circuit and a diagonal cross-resistance 54 has also been inserted. Resulting traces shown in FIG. 12 are quite linear and represent a marked improvement over the uncorrected cell trace shown in FIG. 10.

FIG. 13 shows a still more refined cell and circuit, wherein there is a total of twenty contacts divided into four groups. Each of these groups consists of seven contacts, with four contacts of each group being common to two adjacent groups as shown. The resulting traces 320f and 330f are, for a homogeneous cell, so close to linear that the deviation cannot be readily detected.

The technique shown in FIG. 11 represents a compensating of the intrinsic asymmetry in the cell resistance by the addition of the resistors 52, 53 and 54 which introduce an off-setting or compensating impedance asymmetry in the network. In the other networks shown where non-homogeneity of the cell is either not present or is ignored, the impedance network has substantial impedance symmetry with respect to each of the two axes involved. For example, the resistors 48 in FIG. 9 are equal in value and the resistors 49 are likewise equal in value.

While the instant invention has been shown and described herein in what is conceived to be the most practical and preferred embodiments, it is recognized that departures may be made therefrom within the scope of the invention which is therefore not to be limited to the details disclosed herein, but is to be afforded the full scope of the following claims.

What is claimed is:

1. Junction photocell comprising: a photocell wafer, a first pair of contact groups on said wafer constituting discrete poles from which an output of the photocell is taken, said pair of groups being spaced from each other adjacent opposite ends of an imaginary line constituting a first axis, individual contacts of each group being disposed substantially symmetrically on each side of said axis, conducting networks, one for each group, interconnecting the contacts of the group and including a terminal constituting an output terminal of the cell; a second pair of contact groups constituting discrete poles from which an output of the photocell is taken, the two groups being spaced from each other at opposite ends of an imaginary line transverse of the first mentioned line and constituting a second axis, individual contacts for each group being disposed substantially symmetrically on each side of said second axis, and conducting networks, one for each group, interconnecting the contacts of the group and including a terminal constituting an output terminal of the cell.

2. Photocell in accordance with claim 1 wherein certain contacts constitute members of two adjacent pole groups.

3. Photocell in accordance with claim 1 wherein each of said terminals is connected to a point in its respective network which is electrically centered in the respective group of contacts so as to reside on the electrical counterpart of the axis of the group.

4. Junction photocell comprising a wafer and at least two groups of contacts constituting discrete poles from which the output of the photocell is taken, said groups being spaced from each other adjacent opposite ends of an imaginary line constituting an axis, individual contacts of each group being disposed substantially symmetrically on each side of said axis, and impedance networks, one for each group, interconnecting the contact points of the group and including a terminal constituting an output terminal of the cell.

5. Photocell in accordance with claim 4 wherein said network has substantial impedance symmetry with respect to said axis.

References Cited in the file of this patent

UNITED STATES PATENTS

| | | |
|---|---|---|
| 2,877,284 | Schultz | Mar. 10, 1959 |
| 2,959,681 | Noyce | Nov. 8, 1960 |
| 2,993,998 | Lehovec | June 25, 1961 |

OTHER REFERENCES

Wallmark: Proceedings of the I.R.E., April 1957; pp. 474–482.